United States Patent [19]
Williams et al.

[11] Patent Number: 5,713,057
[45] Date of Patent: Jan. 27, 1998

[54] CAMERA WITH MEANS FOR PREVENTING A CARTRIDGE LIGHT LOCK FROM MOVING FROM AN OPEN TO A CLOSED POSITION WHEN A FILMSTRIP PROTRUDES OUT OF THE CARTRIDGE

[75] Inventors: Patricia Lynn Williams, Rochester; Robert Louis Kuhn, Jr., Rush, both of N.Y.

[73] Assignee: Eastman Kodak Company, Rochester, N.Y.

[21] Appl. No.: 568,214

[22] Filed: Dec. 6, 1995

[51] Int. Cl.⁶ .................... G03B 17/02; G03B 17/26
[52] U.S. Cl. ............................................ 396/513; 396/516
[58] Field of Search .................... 354/388, 275, 354/212, 213; 396/512, 513, 516

[56] References Cited

U.S. PATENT DOCUMENTS

| | | |
|---|---|---|
| 1,389,164 | 8/1921 | Roikjer . |
| 2,771,825 | 11/1956 | Naumann . |
| 4,149,793 | 4/1979 | Date . |
| 5,023,640 | 6/1991 | Diehl ............................ 354/173.1 |
| 5,231,438 | 7/1993 | Smart . |
| 5,359,378 | 10/1994 | Zander et al. ..................... 354/275 |
| 5,481,325 | 1/1996 | Wada et al. ....................... 354/173.1 |
| 5,500,705 | 3/1996 | Stephenson, III .................. 354/288 |
| 5,563,672 | 10/1996 | Fuss et al. ........................ 396/538 |
| 5,592,253 | 1/1997 | Nishimura et al. ................. 396/538 |
| 5,600,393 | 2/1997 | Funahashi ........................ 396/513 |
| 5,602,609 | 2/1997 | Balling ........................... 396/284 |

FOREIGN PATENT DOCUMENTS 55-046732  6/1980  Japan ................ G03B 17/02

Primary Examiner—Michael L. Gellner
Assistant Examiner—Daniel Chapik
Attorney, Agent, or Firm—David A. Howley; Charles E. Snee, III

[57] ABSTRACT

A camera includes a chamber for receiving a cartridge having a light lock movable between an open position allowing a filmstrip to exit the cartridge and a closed position sealing the cartridge in a light-tight manner. The camera also includes means for moving the light lock between its open and closed positions. The invention is characterized by means actuateable by movement of the filmstrip from the cartridge, for preventing the moving means from moving the light lock from the open position to the closed position when the filmstrip protrudes out of the cartridge.

9 Claims, 2 Drawing Sheets

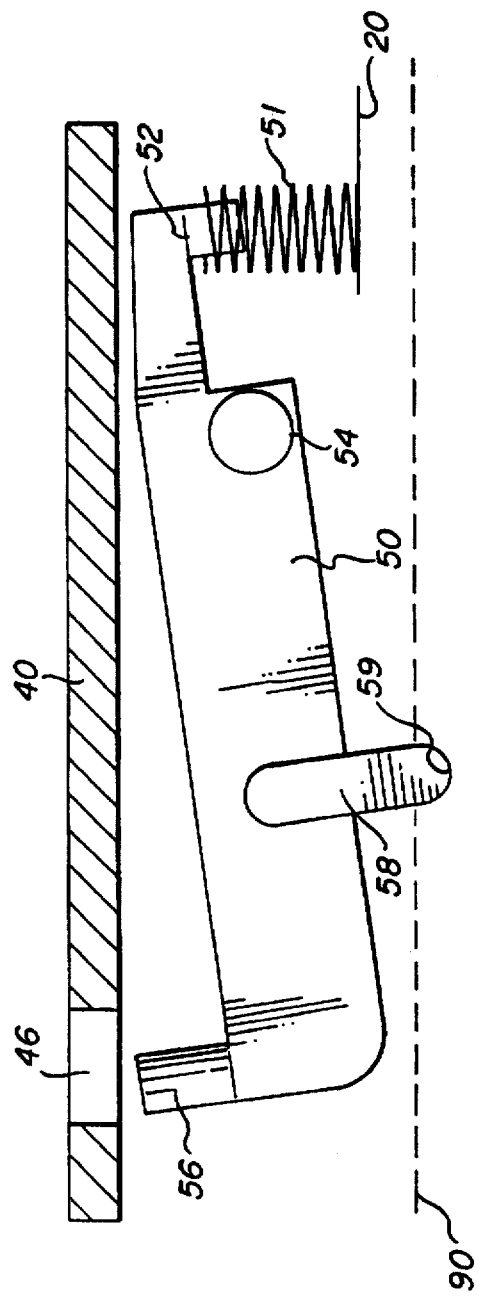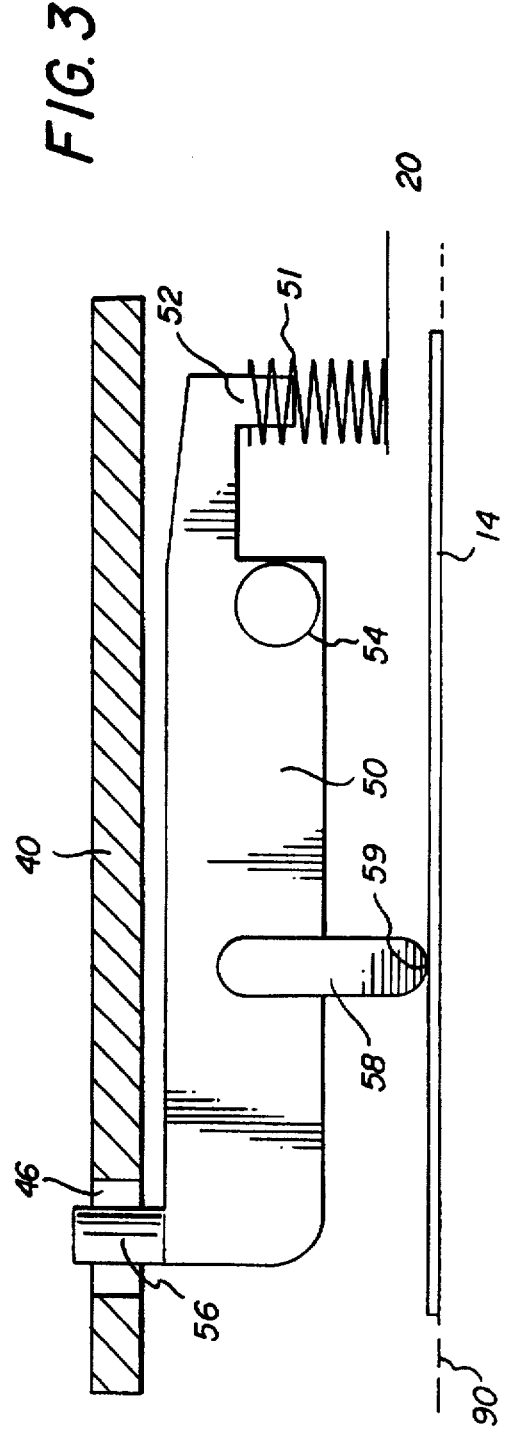

CAMERA WITH MEANS FOR PREVENTING A CARTRIDGE LIGHT LOCK FROM MOVING FROM AN OPEN TO A CLOSED POSITION WHEN A FILMSTRIP PROTRUDES OUT OF THE CARTRIDGE

CROSS-REFERENCE TO RELATED APPLICATIONS

Reference is made to commonly assigned copending application Ser. Nos. 08/568,110 filed Dec. 6, 1995 for PHOTOGRAPHIC SYSTEM FILM DOOR LOCKING MECHANISM AND METHOD and 08/565,463 filed Nov. 30, 1995 for CARTRIDGE HANDLING SYSTEM FOR CAMERA.

FIELD OF THE INVENTION

The invention relates generally to the field of photography, and in particular to cameras. More specifically, the invention relates to a camera with means for preventing a cartridge light lock from moving from an open to a closed position when a filmstrip protrudes out of the cartridge.

BACKGROUND OF THE INVENTION

Commonly assigned U.S. Pat. No. 5,231,438 (the '438 patent) discloses a camera to be used with a self opening cassette. The disclosure of the '438 patent is incorporated herein by reference. The camera includes a chamber for receiving the cassette and a door pivotable between an open position, uncovering the chamber, and a closed position covering the chamber. The cassette includes a light valve movable between an open position, allowing a filmstrip to exit the cassette, and a closed position sealing the cassette in a light-tight manner. An interlock prevents the door from being opened when the light valve cannot be closed because a filmstrip is protruding out of the cassette. As such, images recorded on the filmstrip will not be ruined by exposure to ambient light due to a prematurely opened chamber door.

As described in the '438 patent in col. 8, lines 57–62, "the return spring 159 can only slightly pivot the second latch 135 because the control shaft 55 cannot be rotationally oriented with its light valve 57 in the closed position since the filmstrip F is protruding from the cassette 1 to block the light valve." In other words, the light valve cannot be moved to its closed position because it hits or contacts the film. Such contact between the film and the light valve is less than optimal. If a camera user attempts to force the light valve to a closed position with film protruding from the cassette, the resulting contact between the film and light valve can cause damage to the film (e.g. scratching), light valve (e.g. yielding or buckling) and/or other camera mechanisms.

SUMMARY OF THE INVENTION

The present invention is directed to overcoming one or more of the problems set forth above. Briefly summarized, according to one aspect of the present invention, a camera includes a chamber for receiving a cartridge having a light lock movable between an open position allowing a filmstrip to exit the cartridge and a closed position sealing the cartridge in a light-tight manner. The camera also includes means for moving the light lock between its open and closed positions. The invention is characterized by means actuateable by movement of the filmstrip from the cartridge, for preventing the moving means from moving the light lock from the open position to the closed position when the filmstrip protrudes out of the cartridge.

By preventing the light lock from moving from its open position to its closed position when the filmstrip protrudes out of the cartridge, the light lock is prevented from closing on the filmstrip. As such, possible damage to the filmstrip and/or light lock is avoided.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 2 is an end view of the camera of FIG. 1 looking along the direction of arrow A when film has not been thrust from a film cartridge; and FIG. 3 is an end view of the camera of FIG. 1 looking along the direction of arrow A when film has been thrust from a film cartridge.

DETAILED DESCRIPTION OF THE INVENTION

Figure 1:
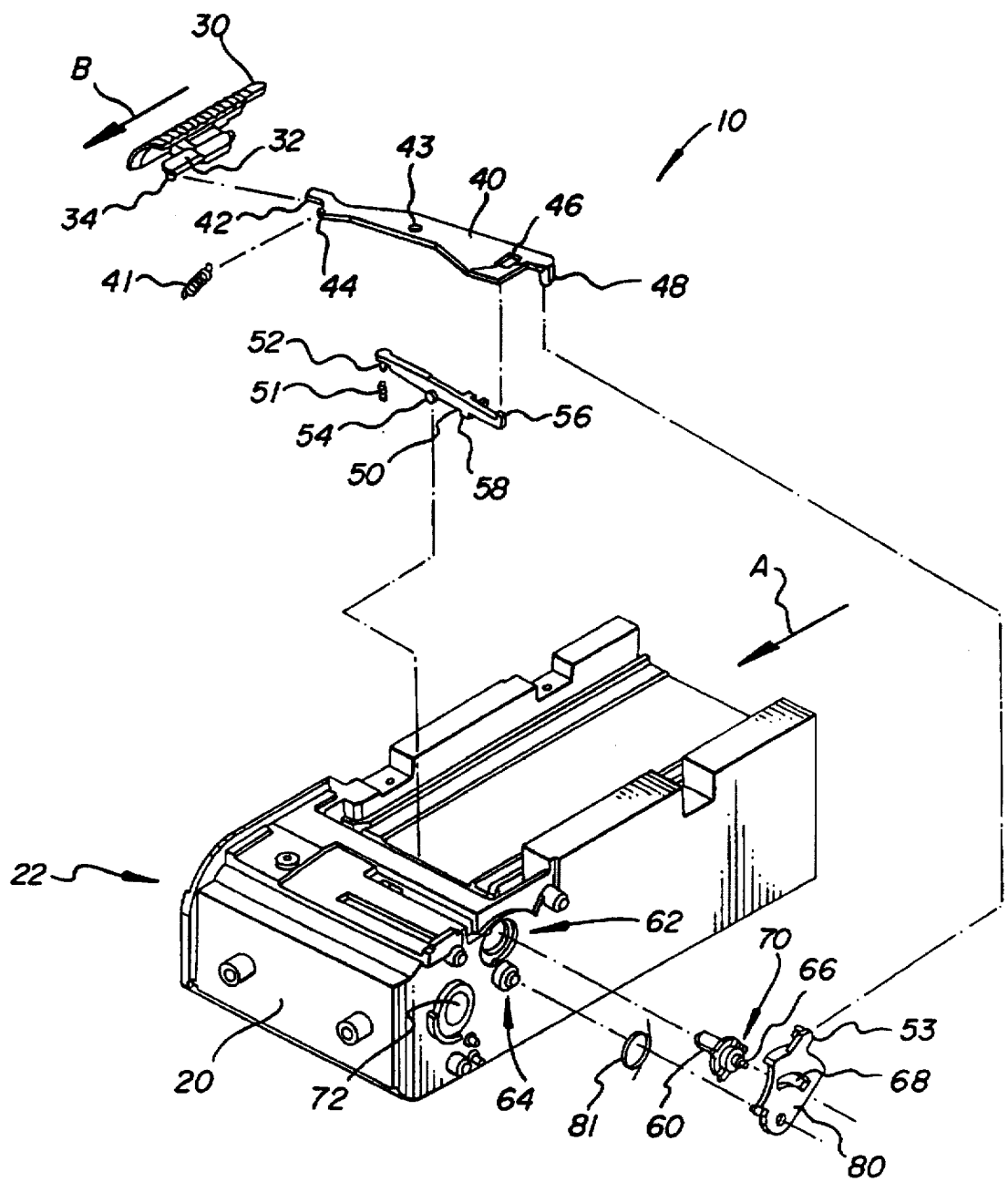
FIG. 1 is an exploded view of a camera incorporating the present invention.

Beginning with FIG. 1, a camera 10 includes a body 20 defining a film chamber 22 which is designed to receive a thrust type film cartridge (not shown) such as the cartridge disclosed in the above-referenced '438 patent. The cartridge includes a light lock movable between an open position, allowing film to be thrust from the cartridge by rotating a film spool, and a closed position sealing the cartridge in a light-tight manner. A spring-loaded chamber door (not shown) is biased towards an open position and, when closed, seals chamber 22 in a light-tight manner. A manually operable door release (actuator) 30, for releasing the chamber door, has an arm 32 with a first pin 34 at one end of arm 32. First pin 34 engages a first pin engaging surface 42 of a lever (drive member) 40. Lever 40 is secured to camera body 20 for rotation about a pivot 43. Lever 40 rotates about an axis which is perpendicular to a direction of travel of the film as it exits the cartridge. A tension spring 41 is hooked at one end to hooked portion 44 of lever 40 and at the other end to camera body 20 to urge the lever 40 counterclockwise about pivot 43. Lever 40 includes an interlock aperture 46.

A film plane interlock (lock member) 50 is located immediately adjacent to the film chamber and an aperture of the film cartridge through which photographic film emerges to provide maximum security from unintentional exposure. Interlock 50 is mounted to camera body 20 for rotation about pivot 54. Interlock 50 rotates about an axis which is parallel to a direction of travel of the film as it exits the cartridge. Film plane interlock 50 includes an interlock pin 52 that captures a film plane interlock compression spring 51 whose other end engages the camera body. As such, the film plane interlock is urged clockwise from a film present (locked) position toward a no film present (unlocked) position. Film plane interlock 50 has at the opposite end from interlock pin 52 an interlock pawl 56 located to be moved into a path of movement of lever 40 into aperture 46 when film is protruding from the film cartridge (described further below). An interlock foot 58 is located part way between interlock pivot 54 and interlock pawl 56. Interlock foot 58 has a film engaging surface on its bottom side that is curved in shape. This shape allows film to easily engage interlock foot 58 without undue friction or blockage.

A light lock drive mechanism includes a light lock drive sector 80, a light lock yoke 60 and a sector spring 81. A pawl 48 located on the opposite end of lever 40 engages a lever engaging surface 53 on drive sector 80. Yoke 60 extends into chamber 22 via an aperture 62 to engage a cartridge light lock. Spring 81 is mounted about a post 64 to which drive sector 80 is rotatably mounted. Drive sector 80 is biased clockwise about post 64 by spring 81. A post 66 on yoke 60 extends into a slot 68 in drive sector 80. A pin (not shown) on a surface of drive sector 80 opposing yoke 60 rides in a slot 70 in yoke 60 to rotate yoke 60 as drive sector 80 rotates.

In operation, a camera user loads a film cartridge into chamber 22 and then closes the chamber door. Full closure of the chamber door releases a latch (not shown) allowing door release 30 to be moved in the direction of an arrow B, thereby securing the chamber door closed. Release 30 is moved by surface 42 pressing against pin 34 as lever 40 rotates counterclockwise under the influence of spring 41. Rotation of lever 40 allows drive sector 80 to rotate clockwise under the influence of spring 81. Rotation of drive sector 80 causes yoke 60 to rotate clockwise, thereby opening the cartridge light lock.

After the cartridge light lock has been moved to an open position, a camera drive spindle (not shown), which engages a cartridge spool via aperture 72, is rotated to turn the spool and thrust the film out of the cartridge. As the film exits the cartridge, a back surface of the film engages foot 58 causing interlock 50 to rotate counter clockwise against the force of spring 51. Such rotation of interlock 50 causes pawl 56 to extend into aperture 46, there by preventing lever 40 from rotating about pivot 43. As such, the camera operator cannot move release 30 in the direction opposite arrow B to close the cartridge light lock when film protrudes from the cartridge because lever 40 is locked against rotation.

After the last picture has been taken, the film is wound completely back into the cartridge. After the lead end of the filmstrip has passed by foot 58, interlock 50 is rotated clockwise by spring 51, thereby withdrawing pawl 56 from aperture 46. Lever 40 is now free to rotate about pivot 43. The camera operator can now move release 30 in a direction opposite arrow B. Such movement causes lever 40 to rotate clockwise via the interaction of pin 34 and surface 42. Clockwise rotation of lever 40 rotates drive sector 80, and thus yoke 60, counterclockwise via interaction of pawl 48 and surface 53, thereby closing the cartridge light lock. Further movement of release 30 in the direction opposite arrow B releases the chamber door to open and actuates a cartridge ejector (not shown) to eject the film cartridge partially out of chamber 22.

The operation of the film plane interlock will be described with reference to FIGS. 2 and 3. The view shown in FIGS. 2 and 3 is looking along the direction of arrow A (FIG. 1), such that film 14 (FIG. 3) would emerge from the plane of the paper as it is thrust from the film cartridge. The film plane interlock 50 is shown in a no film present or unlocked position in FIG. 2. When in the unlocked position, film plane interlock spring 51 pushes on one end of film plane interlock 50, causing film plane interlock 50 to pivot about interlock pivot 54 so that interlock foot 58 crosses film plane 90. Interlock pawl 56 does not engage interlock aperture 46 in lever 40.

FIG. 3 shows the film plane interlock in the locked or film present position. As the film 14 emerges from the film cartridge (out of the plane of the paper), the film 14 proceeds along the film plane 90 until it engages film engaging surface 59 of interlock foot 58. As film 14 continues to move out of the film cartridge, the film 14 pushes interlock foot 58 out of film plane 90. This motion causes film interlock 50 to rotate about interlock pivot 54 such that interlock pawl 56 engages interlock aperture 46 of lever 40. Lever 40 and door release 30 cannot move while interlock pawl 56 engages interlock aperture 46. Thus the cartridge light lock cannot be closed while film 14 protrudes from the film cartridge.

The invention has been described with reference to a preferred embodiment. However, it will be appreciated that variations and modifications can be effected by a person of ordinary skill in the art without departing from the scope of the invention.

Parts List
10 camera
14 film
20 body
22 film chamber
30 door release
32 arm
34 first pin
40 lever
41 lever spring
42 first pin engaging surface
43 lever pivot
44 first lever spring retainer
46 interlock aperture
48 pawl
50 film plane interlock
51 film plane interlock spring
52 interlock pin
53 lever engaging surface
54 interlock pivot
56 interlock pawl
58 interlock foot
59 film engaging surface
60 yoke
62 aperture
64 post
66 post
68 slot
70 slot
72 aperture
80 drive sector
81 spring
90 film plane

We claim:
1. A camera, comprising:
a chamber for receiving a cartridge, the cartridge having a light lock movable between an open position allowing a filmstrip to exit the cartridge and a closed position sealing the cartridge in a light-tight manner;
a mechanism for moving the light lock between open and closed positions;
said mechanism for moving including a light lock drive for engaging and moving the light lock between the open and closed positions, a drive member for engaging and moving said light lock drive to move the light lock, and a manually operable actuator for engaging and moving said drive member;
a mechanism, actuateable by movement of the filmstrip from the cartridge, for preventing said mechanism for moving from moving the light lock of the cartridge from the open position to the closed position when the filmstrip protrudes out of the cartridge; and
said mechanism for preventing including a lock member which is contacted by the filmstrip during movement of the filmstrip from the cartridge to move a portion of said lock member into an aperture in said drive member to limit movement of said drive member.

2. The camera of claim 1, wherein said drive member is pivotable about an axis which is perpendicular to a direction of travel of the filmstrip during movement of the filmstrip through the camera.

3. The camera of claim 1, wherein said lock member pivots about an axis which is parallel to a direction of travel of the filmstrip during movement of the filmstrip from the cartridge.

4. The camera of claim 1, further comprising a spring for biasing said portion of said lock member away from said aperture before movement of the filmstrip from the cartridge.

5. The camera of claim 1, further comprising a foot on said lock member for engaging a back surface of the filmstrip.

6. A camera, comprising:

a chamber for receiving a cartridge, the cartridge having a light lock movable between an open position allowing a filmstrip to exit the cartridge and a closed position sealing the cartridge in a light-tight manner;

a mechanism for moving the light lock between open and closed positions;

said mechanism for moving including a light lock drive for engaging and moving the light lock between the open and closed positions, a drive member for engaging and moving said light lock drive to move the light lock, and a manually operable actuator for engaging and moving said drive member;

said drive member being pivotable about an axis which is perpendicular to a direction of travel of the filmstrip during movement of the filmstrip through the camera; and a mechanism, actuateable by movement of the filmstrip from the cartridge, for preventing said mechanism for moving from moving the light lock of the cartridge from the open position to the closed position when the filmstrip protrudes out of the cartridge.

7. A camera, comprising:

a chamber for receiving a cartridge, the cartridge having a light lock movable between an open position allowing a filmstrip to exit the cartridge and a closed position sealing the cartridge in a light-tight manner;

a mechanism for moving the light lock between open and closed positions;

said mechanism for moving including a light lock drive for engaging and moving the light lock between the open and closed positions, a drive member for engaging and moving said light lock drive to move the light lock, and a manually operable actuator for engaging and moving said drive member;

a mechanism, actuateable by movement of the filmstrip from the cartridge, for preventing said mechanism for moving from moving the light lock of the cartridge from the open position to the closed position when the filmstrip protrudes out of the cartridge; and said mechanism for preventing including a lock member which is contacted by the filmstrip during movement of the filmstrip from the cartridge to move a portion of said lock member into a path of movement of said mechanism for moving to prevent the light lock from moving from the open position to the closed position, said lock member being pivotable about an axis which is parallel to a direction of travel of the filmstrip during movement of the filmstrip from the cartridge.

8. The camera of claim 7, further comprising a spring for biasing said lock member away from said path of movement before movement of the filmstrip from the cartridge.

9. The camera of claim 7, further comprising a foot on said lock member for engaging a back surface of the filmstrip.

* * * * *